June 18, 1963 R. C. BYLOFF 3,094,132
ELECTROMAGNETIC FLUID PRESSURE MODULATING VALVE
Filed Dec. 24, 1959 2 Sheets-Sheet 1

INVENTOR:
ROBERT C. BYLOFF,
BY Myron J. Seibold
Attorney.

June 18, 1963    R. C. BYLOFF    3,094,132
ELECTROMAGNETIC FLUID PRESSURE MODULATING VALVE
Filed Dec. 24, 1959    2 Sheets-Sheet 2

INVENTOR:
ROBERT C. BYLOFF,
BY Myron J. Seibold
Attorney.

United States Patent Office 3,094,132
Patented June 18, 1963

3,094,132
ELECTROMAGNETIC FLUID PRESSURE MODULATING VALVE
Robert C. Byloff, Los Angeles, Calif., assignor to The Garrett Corporation, Los Angeles, Calif., a corporation of California
Filed Dec. 24, 1959, Ser. No. 861,841
16 Claims. (Cl. 137—85)

This invention pertains to valves, and more particularly to an electromagnetic valve for converting an electrical signal into a fluid pressure signal which is proportional to the electrical signal.

This application is a continuation in part of application Serial No. 661,225 filed May 23, 1957, now abandoned, for Electromagnetic Valve.

In many applications in industry, a change in a controlled condition is indicated by an electrical signal while the means used to operate the controls are operated by some other media than electricity. Thus, it is necessary to convert the electrical signal to a proportional signal in the operating medium in order to operate the controls.

This invention solves the above problem by providing an electromagnetic valve which produces a fluid pressure signal which is proportional to the electrical signal generated by the controls. The invention utilizes a poppet valve to vent compressed air from a pneumatically operated actuator which controls the position of a control element. While the specific embodiment of this invention is applied to a system using compressed air as the operating medium, it of course could also be applied to systems using other fluids as the operating medium.

Accordingly, it is the principal object of this invention to provide a novel electromagnetic valve which is capable of providing a pressurized fluid signal proportional to the electrical signal used for energizing the solenoid of the valve.

Another object of this invention is to provide a novel electromagnetic valve which is capable of providing a pressurized fluid signal which is proportional to the electrical signal used for energizing the solenoid coil of the valve with a novel means for dithering the movable valve element in order to overcome friction of the movable valve element.

Another object of this invention is to provide an electromagnetic valve which is capable of providing a pressurized fluid signal proportional to the electrical signal used for energizing the solenoid coil of the valve with a novel feedback means which is responsive to the pressurized fluid signal.

Still another object of this invention is to provide a novel design of an electromagnetic valve which is small and compact and capable of providing a pressurized fluid signal proportional to the electrical signal used for energizing the solenoid of the valve.

These and other objects and advantages of this invention will be more apparent to those skilled in the art from the following detailed description of a preferred embodiment when taken in conjunction with the accompanying drawings, in which.

Figure 1:
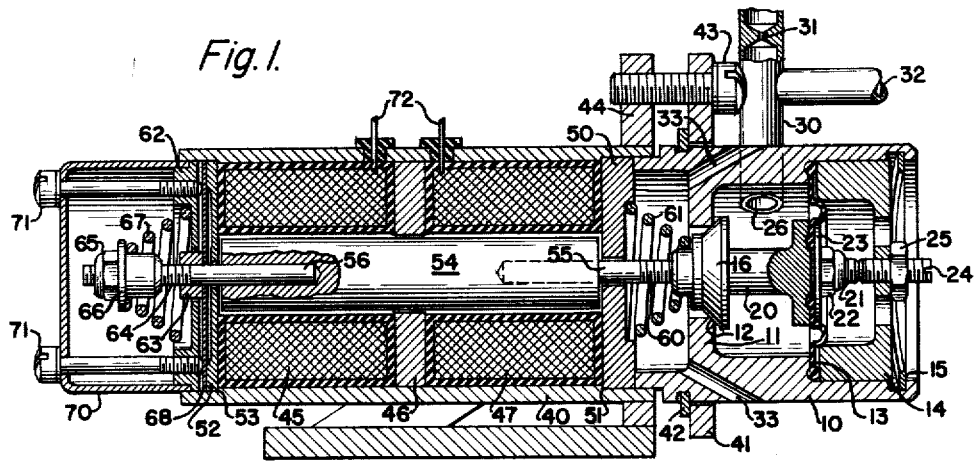
FIG. 1 is a longitudinal section showing the construction of the poppet valve and the construction of the electromagnet which is used for positioning the poppet valve.

FIG. 1 shows an electromagnetic valve having a tubular valve body 10 which is preferably formed of a non-magnetic material such as aluminum or the like. The valve body 10 is provided with an inwardly projecting radial wall 11 having a central opening. The inner right-hand edge 12 of the central opening in the radial wall 11 acts as the poppet valve seat. The right-hand end of the valve body is closed by means of a flexible diaphragm 13, the outer edge of which is secured to an inwardly projecting shoulder formed on the valve body 10 by means of an end cap 14. The end cap 14 is retained in the valve body by any desired means such as a snap ring 15 which fits in a cooperating groove formed in the valve body, or other fastening means.

A poppet valve disc 16 is disposed in the chamber formed by the diaphragm 13 and the radial wall 11 so as to engage the valve seat 12. The valve disc 16 is provided with a valve stem portion 20 which projects axially from its right-hand surface. A threaded end portion 21 of the valve stem 20 projects through a central opening in the diaphragm 13 and is secured to the flexible diaphragm by means of a nut 22, which threads over the threaded portion 21, and a diaphragm washer 23. An adjustable stop 24 which threads into a central opening in the end cap 14 and a jam nut 25 are provided for limiting the axial movement of the valve disc 16 in one direction. It will be observed in FIG. 1 that the effective area of the diaphragm 13 is somewhat greater than that of the poppet valve 16, for a purpose to be described later.

The valve body 10 is provided with an inlet opening 26 which opens into the chamber formed between the diaphragm 13 and the radial wall 11. The inlet opening 26 is connected to any desired source of pressurized fluid having a regulated pressure by means of a conduit 30. The conduit 30 is provided with orifice means 31 having a fixed opening so as to meter the amount of pressurized fluid supplied to the valve. Another conduit 32 is connected to the conduit 30 between the fixed orifice means 31 and the inlet opening 26 and is used for supplying a pressurized fluid signal which is proportional to the electrical control signal, as will be explained below. A plurality of circumferentially spaced exhaust openings 33 are formed in the side wall of the valve body 10 and open into the interior of the valve body on the left-hand side of the radial wall 11. The exhaust openings 33 may be connected to a manifold pipe, if desired, which will then permit the valve to be used in bleed-off or bleed-on systems.

The left-hand end of the valve body 10 is connected to a tubular solenoid housing 40 which is preferably formed of magnetic material such as carbon steel, or the like. The valve body 10 is fastened to the solenoid housing 40 by means of a plurality of cap screws 43 which pass through a flange 41 secured to the valve body 10 and thread into a flange 44 secured to the solenoid housing 40. The flange 41 may be secured to the valve body by any desired means, such as a snap ring 42, or the like, while the flange 44 is fastened to the solenoid housing by any desired means, such as welding or the like.

An end spacing member 50 is positioned in the right-hand end of the solenoid housing 40 and is secured against a shoulder 51 formed on the inner surface of the solenoid housing by the left-hand end of the valve body 10. The spacing member 50 is preferably formed of the same magnetic material as the solenoid housing 40. A similar spacing member 52 is positioned in the left-hand end of the solenoid housing 40 and is secured against a shoulder 53 formed on the solenoid housing by any desired means such as a force fit, or the like. Mounted in the interior of the solenoid housing 40, between the two end spacing members 50 and 52, are two substantially identical solenoid coils 45 and 47. Positioned between the adjacent ends of the two solenoid coils 45 and 47 is a center spacing member 46 which is also preferably formed of the same magnetic material as the solenoid housing.

A common armature element 54 is disposed in the central opening of the two solenoid coils and the center spacing member 46 and is preferably formed of the same magnetic material as the solenoid housing. The common armature 54 is provided with extensions 55 and 56 at opposite ends which are secured in an axial opening formed in the ends of the armature by any desired means such as a press fit, or the like. The extension 55 has a threaded end 60 which threads into the outlet side of the valve disc 16 so as to secure the armature 54 to the valve disc.

Disposed in the annular space between the radial wall 11 of the valve body and the right-hand magnetic spacing member 50 is a conically wound compression spring 61 which reacts against the spacing member to urge the valve disc 16 to the right as seen in FIG. 1. The right-hand end of the spring 61 is a close fit on the cylindrical end of the valve disc 16, while the left-hand end is a close fit in a cylindrical depression formed in the spacing member 50 so as to assist in supporting the movable valve elements. A similar conically wound spring 67 is postioned over the other armature extension 56 and is secured thereto by means of a spring washer 66 and a nut 65 which threads over the end of the extension 56. The spring 67 reacts against an additional spacing member 62 which is retained in the end of the solenoid housing by means of a force fit, or the like, and the spring washer 66 to urge the valve disc 16 to the left, as seen in FIG. 1. A flat spring member 68 is disposed between the end spacing member 52 and the additional spacing members 62 for supporting a bushing 63 used as a guide for the armature extension 56. Of course, the movable valve elements are also partially supported by the spring 67 in the same manner as spring 61 supports the movable valve elements. The end of the valve is provided with a dust cover or end cap 70 which is secured to the spacing member 62 by a plurality of cap screws 71. The leads 72 of the two solenoid coils are threaded through suitable openings formed in the solenoid housing and are held therein by means of a suitable insulating compound.

From the above description it can easily be seen that this invention provides an electromagnetic valve utilizing a poppet type valve which is mounted coaxially with the axis of the solenoid coils of the electromagnet. One side of the valve disc is attached to a flexible diaphragm which, with the valve seat and disc, forms a closed chamber to which a pressurized fluid having a regulated pressure is admitted.

When, for example, an increase of current in the solenoid 45 occurs, the valve 16 moves toward a closed position and further restricts fluid flow from the chamber. As a consequence, pressure in the chamber increases, and the diaphragm 13 feeds back a force to the valve 16 which tends to move the latter to an open position. This will occur by reason of the fact that the effective area of the diaphragm is greater than that of the valve.

If, on the other hand, the current in solenoid 45 decreases, the valve moves toward a more open position, with a consequent lessening in the pressure in the chamber causing the diaphragm to lessen its opening bias on the valve. Hence, by definition, the action of the diaphragm on the valve is a negative feedback. It is apparent, of course, that if the effective area of the diaphragm were smaller than that of the valve, the diaphragm would provide positive feedback to the valve.

Thus, the diaphragm will supply a negative feedback force when the valve is opened or closed, which is responsive to any change in the fluid pressure. The other side of the valve disc is connected to an armature which is common to the two solenoid coils 45 and 47. Compression springs are provided at each end of the armature so that the valve will be returned to a null position when the solenoid coils are deenergized. By adjusting the tension of the compression springs, by means of the nut 65, or using springs having different characteristics, the null position can be the full-open or full-closed position of the valve or any intermediate position, as will be explained hereinafter.

The electromagnet consists of two separate solenoids 45 and 47 which are provided with a magnetic spacing member between their adjacent ends, and additional magnetic spacing members at their opposite ends. The central opening of the solenoids is substantially the same as the central opening in the spacing member 46, while the central opening in the end spacing members 50 52 and 62 is substantially smaller than the central opening of the solenoid coils. There is thus provided a good flux path between thei ndividual solenoid coils and the common armature member 54 so that a very small change in the electrical signal applied to the solenoid coils will easily re-position the valve disc 16.

The movable elements of the valve and electromagnet are supported at their right-hand end by the flexible diaphragm 13 and the spring 61, while the left-hand end is supported by the bushing 63 and the spring 67. Thus the radial clearance between the movable armature 54 and the central opening in the solenoid coils and the center spacing member may be made very small thereby improving the flux linkage between the solenoid coils and the armature.

Figure 2:
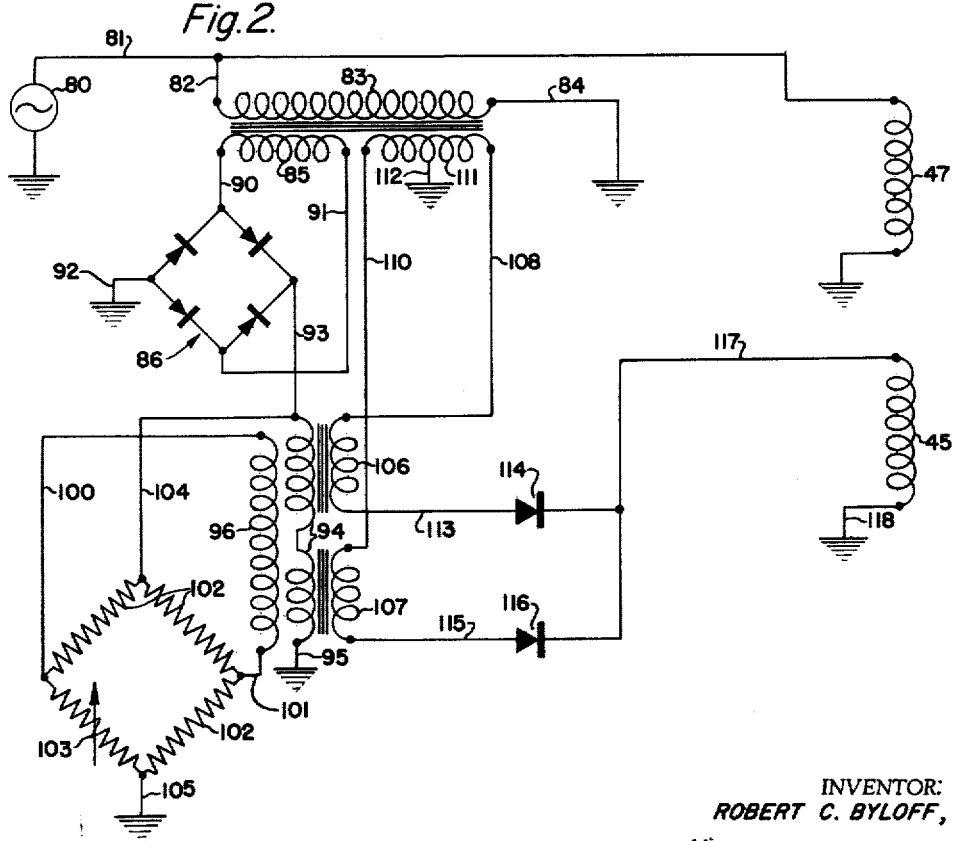
FIG. 2 is a schematic wiring diagram showing the valve of FIG. 1 controlled by the output of a magnetic amplifier which is responsive to an electrical control signal.

Referring now to FIG. 2, there is shown the above described valve installed in a system in which an electrical signal is applied to a magnetic amplifier whose output in turn is used to energize the solenoid coil 45. One side of the other solenoid coil 47 is connected to an alternating current power supply 80 by means of a lead 81 and the other side is connected to ground. The power supply 80 may be of any desired frequency and for a particular application was designed as a 400 cycles per second power supply. One side of the primary winding 83 of a power transformer is connected to the lead 81 by means of a lead 82 while the other side of the primary winding is connected to ground by means of a lead 84.

The power transformer is provided with two secondary windings 85 and 111. The secondary winding 85 is connected to the input corners of a bridge rectifier by means of leads 90 and 91. The negative corner of the rectifying bridge is connected to ground by means of a lead 92 while the positive corner of the bridge is connected to the bias winding 94 of the magnetic amplifier by means of a lead 93. The opposite end of the bias winding is connected to ground by means of a lead 95. The positive corner of the bridge rectifier is also connected to one corner of the bridge rectifier is also connected to one corner of a Wheatstone bridge circuit by means of a lead 104 and the opposite corner of the bridge circuit is connected to ground by means of a lead 105. The bridge circuit consists of three resistors 102 having a fixed value and a fourth resistor 103 whose resistance may be varied. The other two corners of the bridge circuit are connected to the control winding 96 of the magnetic amplifier by means of leads 100 and 101.

Setting of the resistor 103 is controlled by a sensing element, not shown, located within an environment having characteristics which influence the sensing element. Characteristics such as temperature, pressure or a combination of these may be detected by this sensing element, which may be of a type well known in the sensing element art. The influence of these characteristics upon the sensing element, not shown, will produce a response in a manner well known in the art. This response is utilized in a manner also well known in the art to vary the setting of resistor 103 so as to reflect changes in the environmental characteristics so sensed.

The ends of the secondary winding 111 of the power transformer are connected to the output windings 106 and 107 of the magnetic amplifier by leads 108 and 110, respectively. The center of the secondary winding 111 is connected to ground by means of a lead 112. The output winding 106 is connected to a rectifying element 114 by means of a lead 113 while the output winding 107 is connected to a rectifying element 116 by means of a lead 115. The outputs of the two rectifying elements 114 and 116 are connected to a common lead 117 which, in turn, is connected to the second solenoid coil 45 of the valve. The other side of the second solenoid coil is connected to ground by means of a lead 118.

The above described circuit provides a means for energizing the solenoid coil 47 of the valve with an alternating or periodic current so as to effect a dithering of the movable elements of the valve. Of course, the frequency must be lower than the natural frequency of the movable valve elements, but high enough so as not to affect the output of the valve. This dithering action is very important in a valve which is designed to provide an output signal proportional to an electrical signal applied to the solenoid coil of the valve. In previous valves in which no dithering action was provided, the valve would tend to stick in certain positions and then exhibit a hysteresis type of movement when the control signal on the solenoid coil 45 changed. With a control signal applied to only one solenoid coil, as in FIG. 2, the bias of spring 67 is adjusted so that the valve null point will be either its full open or full closed position, depending upon whether the pressure signal is to change in the same or reverse sense sense with change in the value of the control signal. For example, before a control signal is applied to solenoid coil 45 the valve may be biased to a fully open position. An application of a control signal to coil 45 will then tend to close the valve and thus produce an increase in the pressure signal. With solenoid coil 45 fully energized by the control signal, the valve would be biased to a fully closed position, and a decrease in the control signal would then effect a change of pressure signal in the same sense. It will further be clear that in some applications the valve may be simplified by feeding both the control signal and the dithering alternating current to a single operating coil as is shown and described with respect to the coil 47 of the differential control of FIG. 3. In this arrangement the second coil and the corresponding portion of the solenoid could be eliminated.

Due to the efficient flux linkage of the electromagnet used for operating the valve, a very small change in the output signal of the magnetic amplifier is capable of repositioning the valve. Since the valve is supplied with a controlled amount of a fluid having a regulated pressure, the opening and closing of the valve to vent fluid to the atmosphere will modulate the pressure of the fluid in the enclosed chamber and hence in the conduits 30 and 32 so that the pressure existing between the valve and the fixed orifice means 31 is always proportional to the output signal of the magnetic amplifier.

Figure 3:
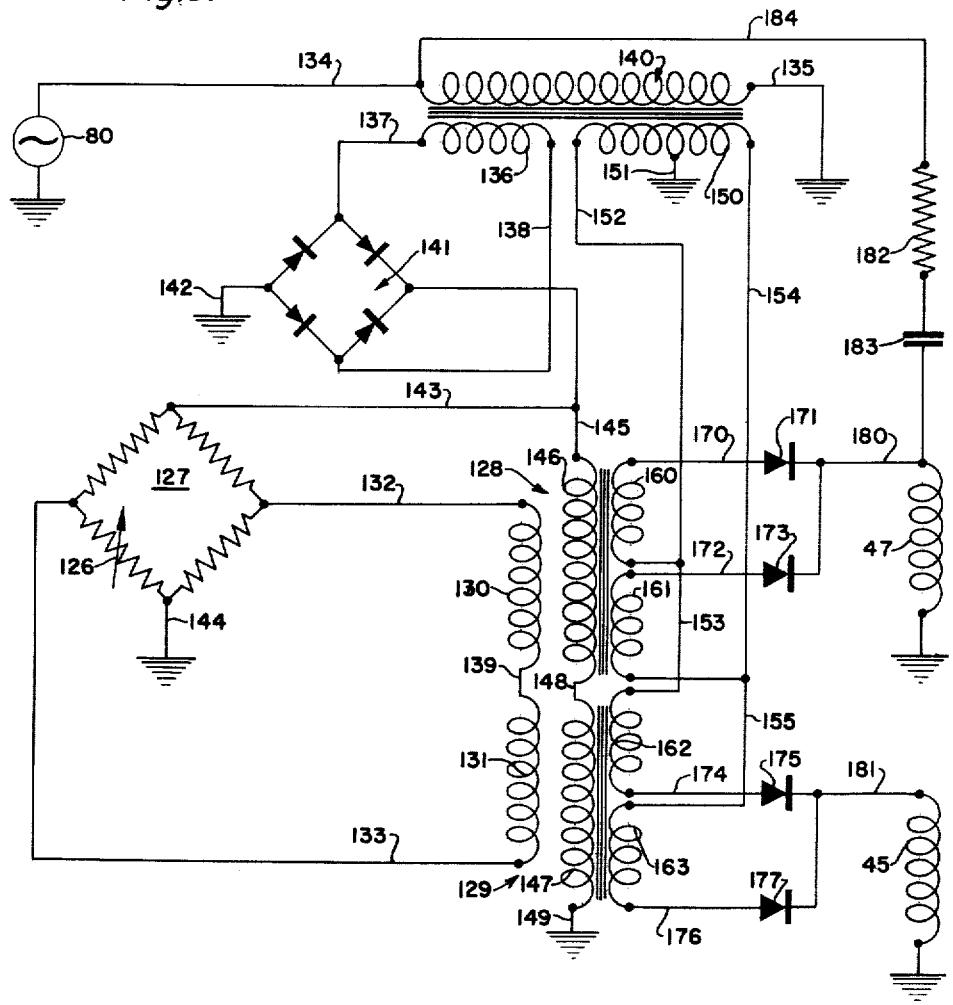
FIG. 3 is a schematic wiring diagram of a differential control for the solenoid valve of FIG. 1.

FIG. 3 shows a differential control system for the double coil solenoid valve of FIG. 1 in which both of the coils 45 and 47 are energized by control signals varying in intensity with the response of a condition sensor, not shown, so that the movement of the valve core 54 is effected in response to the differential of the magnetomotive forces exerted by the individual solenoid coils 45 and 47. This system is governed by the response of a sensing element, not shown, which varies the resistance value of resistance leg 126 in bridge circuit 127. The resistance 126 is controlled by a conventional sensing element, not shown, so as to reflect changes in environmental characteristics which influence such a sensing element. Thus, resistance 126 is controlled in the same manner as described in the control of resistor 103 of FIG. 2.

Two corners of the bridge circuit 127 are connected to the control windings 130 and 131 of two separate magnetic amplifiers 128 and 129, respectively, by means of leads 132 and 133. The two adjacent ends of the control windings 130 and 131 are connected by means of a lead 139. The bridge circuit 127 is supplied with direct current power rectified from the output of a power transformer 140 having a primary winding, one end of which is connected to an alternating current supply by means of a lead 134, the other end of the primary winding being connected to ground by means of a lead 135.

The power transformer is provided with two separate secondary windings 136 and 150. The secondary winding 136 is connected to a bridge rectifier 141 by means of leads 137 and 138. The negative corner of the bridge rectifier is connected to ground by means of a lead 142 while the positive corner is connected to one corner of the bridge circuit 127 by means of a lead 143. The opposite corner of the bridge circuit 127 is connected to ground by means of a lead 144. The positive corner of the bridge rectifier 141 is also connected to one end of the bias winding 146 of the magnetic amplifier 128 by means of a lead 145. The opposite end of the bias winding 146 is connected to one end of the bias winding 147 of the magnetic amplifier 129 by means of a lead 148 while the opposite end of the bias winding 147 is connected to ground by means of a lead 149.

One end of the other secondary winding 150 of the power transformer is connected to the output winding 160 of the magnetic amplifier 128 by means of a lead 152 and a lead 153 connects the output winding 162 of the magnetic amplifier 129 to the lead 152. The other output windings 161 and 163 of the magnetic amplifiers 128 and 129, respectively, are connected to the other end of the secondary 150 by means of leads 154 and 155. The output windings 160 and 161 are connected to rectifying elements 171 and 173, respectively, by means of leads 170 and 172. The outputs of the rectifying elements 171 and 173 are connected together and connected to one side of the solenoid coil 47 by means of a lead 180, while the other side of the solenoid coil 47 is connected to ground. The output windings 162 and 163 are connected to rectifying elements 175 and 177, respectively, by means of leads 174 and 176. The outputs of the rectifying elements 175 and 177 are connected together and connected to one side of the other solenoid coil 45 of the valve by means of a lead 181 while the other side of the solenoid coil 45 is connected to ground.

In the system of FIG. 3 both magnetic amplifiers 128 and 129 are normally conducting under the bias of coils 146 and 147 and when the bridge 127 is in balance no current is fed through the control windings 130 and 131 so the currents through coils 45 and 47 are equal and the core 54 seeks its null point which will have been adjusted through spring 67 to be midway between its closed and fully open positions. Should there be a change in the condition or characteristic being observed, the resistance value of resistance 126 will be changed accordingly as described hereinbefore, and the bridge 127 will become unbalanced to produce an output current whose polarity will depend upon the direction of change in the condition and in the resistance 126. This bridge output current, flowing through both the control windings 130 and 131, will increase the output of one of the magnetic amplifiers and decrease the output of the other so that one of the solenoid coils will produce a magnetomotive force exceeding the other. The core 54 will then move in the direction of the increased magnetomotive force to move the valve toward open or closed position, depending on the polarity of the control current. The position of the valve poppet disc 16 is thus controlled by the differential between the magnetomotive forces induced by the solenoid coils 45 and 47 and this differential is proportional to the unbalance of the bridge 127 caused by a change in the resistance value of resistance 126 controlled in a manner as described hereinbefore.

The alternating current dither in FIG. 3 is applied to the armature 54 by the energization of the coil 47 through a series limiting resistor 182 and a condenser 183 by a conductor 184 connected to the lead 134 at the ungrounded side of the power supply 80. The condenser 183 passes the alternating or periodic dithering current, but blocks the passage of the direct control current therethrough. The resulting magnetomotive force generated or induced by the coil 47 will then be unidirectional but with a self-imposed ripple produced by the alternating dithering current.

While certain preferred embodiments of the invention have been specifically disclosed, it is understood that the invention is not limited thereto, as many variations will be readily apparent to those skilled in the art and the invention is to be given its broadest possible interpretation consistent with the prior art.

What is claimed is:

1. An electromagnetic valve for providing a pressurized fluid signal varying in accordance with variation in the electrical signal used to energize the valve comprising: means defining a fluid flow path, a valve element in said path, a fluid flow control orifice in said path, means feeding fluid pressure to the upstream side of said valve element and orifice, a pressure signal take-off intermediate said valve element and orifice, a movable wall disposed adjacent said valve element and subjected on one side to fluid pressure existing on the inlet side of said valve element, said movable wall being connected to said valve element, a solenoid core connected to said valve element to control the position thereof, a pair of energizing coils about said core, means for continuously feeding unidirectional currents to said coils in directions to produce opposite magnetomotive forces therein, and means responsive to change in a condition being sensed to vary the relative values of the currents in said coils to produce a predominating magnetomotive force whose direction and amplitude are determined by the value of the condition being sensed.

2. An electromagnetic valve for providing a pressurized fluid signal varying in accordance with variation in the electrical signal used to energize the valve comprising: means defining a fluid flow path, a valve element in said path, a fluid flow control orifice in said path, means feeding fluid pressure to the upstream side of said valve element and orifice, a pressure signal take-off intermediate said valve element and orifice, a movable wall disposed adjacent said valve element and subjected on one side to fluid pressure existing on the inlet side of said valve element, said movable wall being connected to said valve element, a solenoid core connected to said valve element to control the position thereof, a pair of energizing coils about said core, a pair of magnetic amplifiers each individually feeding one of said energizing coils, and control windings for said magnetic amplifiers, said control windings being fed by an error signal whose polarity and amplitude are determined by the value of a condition being sensed, the outputs of said magnetic amplifiers varying in opposite sense with change in the polarity and amplitude of the error signal so that the position of the core will be determined by the differential of the magnetomotive forces induced by the individual coils.

3. An electromagnetic valve for providing a pressurized fluid signal varying in accordance with variation in the electrical signal used to energize the valve comprising: means defining a fluid flow path, a valve element in said path, a fluid flow control orifice in said path, means feeding fluid pressure to the upstream side of said valve element and orifice, a pressure signal take-off intermediate said valve element and orifice, a movable wall disposed adjacent said valve element and subjected on one side to fluid pressure existing on the inlet side of said valve element, said movable wall being connected to said valve element, a solenoid core connected to said valve element to control the position thereof, a pair of energizing coils about said core, a pair of magnetic amplifiers each individually feeding one of said energizing coils, control windings for said magnetic amplifiers, both fed by an error signal whose polarity and amplitude are determined by the value of a condition being sensed, the outputs of said magnetic amplifiers varying in opposite sense with change in the polarity and amplitude of the error signal so that the position of the core will be determined by the differential of the magnetomotive forces induced by the individual coils, and means feeding one of said coils with an alternating current through means blocking the passage of the unidirectional magnetic amplifier output, said alternating current producing a resultant rippling magnetomotive force in the coil to which it is fed to produce a dithering action on the core facilitating its initial movement upon change in the resultant unidirectional magnetomotive force.

4. An electromagnetic valve comprising: a tubular valve body provided with an annular valve seat formed in said body and having an inlet opening formed in said body on one side of said seat and an exhaust opening formed in said valve body on the opposite side of said seat, a movable wall mounted in said body and axially spaced from said one side of said seat to form a closed chamber surrounding said one side of said seat, a valve disc disposed in said closed chamber to engage said seat, said valve disc having a stem portion extending from each side, one of said stem portions being connected to said movable wall and the other of said stem portions being connected to the common movable armature of a pair of axially aligned spaced-apart solenoids, said solenoids being disposed to be actuated by separate electrical signals, first spring means positioned between said valve disc and said armature to urge said valve disc in one direction, second spring means positioned at the opposite end of said armature for urging said valve disc in the opposite direction, and means for adjusting the force of said first and second spring means which functions to return said valve disc to a null position when one of the electrical signals is removed from said solenoids.

5. An electromagnetic valve comprising: a valve body having an inlet and exhaust opening formed therein, a valve element disposed in said valve body to control fluid flow between said inlet and said exhaust openings, a movable wall disposed adjacent said valve element and subjected on one side to fluid pressure existing in said valve body on the inlet side of said valve element, said movable wall being connected to said valve element, a pair of aligned solenoids disposed adjacent said valve body, a common armature disposed in the central opening of said solenoids, said armature being connected to said valve element, one of said solenoids being energized by a unidirectional electrical signal and the other solenoid being energized by a periodic electrical signal.

6. An electromagnetic valve for providing a pressurized fluid signal varying in accordance with variation in the electrical signal used to energize the valve comprising: means defining a fluid flow path, a valve element in said path, a fluid flow control orifice in said path, means feeding fluid pressure to the upstream side of said valve element and orifice, a pressure signal take-off intermediate said valve element and orifice, a movable wall disposed adjacent said valve element and subjected on one side to fluid pressure existing on the inlet side of said valve element, said movable wall being connected to said valve element, a solenoid core connected to operate said valve element, means for applying a unidirectional magnetomotive force to said core to effect controlling movement thereof and means for applying an alternating magnetomotive force to said core whereby a dithering action is imparted to said solenoid core and valve element, said magnetomotive forces being induced by a plurality of coils producing a resultant ripple in the unidirectional magnetomotive force and with alternating current being fed to at least one coil through an element blocking the passage of unidirectional current therethrough.

7. An electromagnetic valve for providing a pressurized fluid signal varying in accordance with variations in the electrical signal used to energize the valve comprising: means defining a fluid flow path; a valve element in said path; means feeding fluid pressure to the upstream side of said valve element; a pressure signal take-off upstream of said valve element; a movable wall disposed adjacent said valve element and subjected on one side to fluid pressure existing on the inlet side of said valve element, said movable wall being connected to said valve element; a solenoid core connected to operate said valve element; means for applying a unidirectional magnetomotive force to said core to effect controlling movement thereof; and means for applying an alternating magnetomotive force to said core to condition the core for movement by said unidirectional magnetomotive force.

8. An electromagnetic valve as in claim 7 in which said magnetomotive forces are induced by a single coil producing a resultant ripple in the unidirectional magnetomotive force, and with the alternating current being fed to the coil through an element blocking the passage of unidirectional current therethrough.

9. The invention of claim 7 further characterized in that said means for applying an alternating magnetomotive force to said core imparts a dithering action to said core and thus to the moving elements of said valve mechanism for overcoming friction and other adverse characteristics.

10. An electromagnetic valve device for providing a pressurized fluid signal proportional to the electrical signal used to energize the valve comprising: a valve body; inlet and exhaust openings formed in said valve body; a valve element disposed to control the flow of fluid between said inlet and said exhaust openings; conduit means for connecting a source of regulated fluid pressure to said inlet; a movable wall disposed adjacent said valve element and subjected on one side to fluid pressure existing on the inlet side of said valve element, said movable wall being connected to said valve element; plural solenoids, said solenoids being disposed to be energized simultaneously by separate electrical signals; an armature movable within said solenoids, said valve element being connected to said armature; and means for biasing said valve element to a null position in the absence of at least one of said electrical signals.

11. A valve assembly comprising: a valve body having an inlet and exhaust opening formed therein; a valve element disposed in said valve body to control fluid flow between said inlet and said exhaust openings; a movable wall disposed adjacent said valve element and subjected on one side to fluid pressure existing on the inlet side of said valve element, said movable wall being connected to said valve element so as to exert a force on said valve element in proportion to the fluid pressure exerted on said movable wall, means for displacing said valve, means for dithering said valve and means for biasing said valve in a predetermined position whereby said movable wall provides feedback of said fluid pressure to displace the valve.

12. An electromagnetic valve for providing a pressurized fluid signal varying in accordance with variations in the electrical signal used to energize the valve comprising: means defining a fluid flow path; a valve element in said path; means feeding fluid pressure to the upstream side of said valve element; a pressure signal take off upstream of said valve element; a movable wall disposed adjacent said valve element and subjected on one side to fluid pressure existing on the inlet side of said valve element, said movable wall being connected to said valve element; a solenoid core connected to said valve to control the position thereof; a pair of energizing coils surrounding said solenoid core; means for transmitting an alternating magnetomotive force to the first of said coils; a sensing unit for detecting variations from a predetermined condition which may be sensed; means for transmitting an electrical signal which varies in accordance with variations from the predetermined condition sensed by said sensing unit, said electrical signal being transmitted to the second of said coils so that said solenoid core is positioned in accordance with signals received by said second coil.

13. An electromagnetic valve for providing a pressurized fluid signal varying in accordance with variations in the electrical signal used to energize the valve comprising: means defining a fluid flow path; a valve element in said path; means feeding fluid pressure to the upstream side of said valve element; a pressure signal take off upstream of said valve element; a movable wall disposed adjacent said valve element and subjected on one side to fluid pressure existing on the inlet side of said valve element, said movable wall being connected to said valve element; a solenoid core connected to said valve to control the position thereof; a pair of energizing coils about said core; means feeding the first of said coils with a unidirectional signal current for controlling the position of said core; and means feeding the second of said coils with an alternating current for producing a resultant rippling magnetomotive force in said second coil so as to induce a dithering action on said core and thus facilitate initial movement of said core on a change in unidirectional magnetomotive force transmitted to said first coil.

14. An electromagnetic valve for providing a pressurized fluid signal varying in accordance with variations in the electrical signal used to energize the valve comprising: means defining a fluid flow path; a valve element in said path; means feeding fluid pressure to the upstream side of said valve element; a pressure signal take off upstream of said valve element; a movable wall disposed adjacent said valve element and subjected on one side to fluid pressure existing on the inlet side of said valve element, said movable wall being connected to said valve element; a solenoid core connected to said valve to control the position thereof; a pair of energizing coils about said core; means feeding the first of said coils with a unidirectional signal current; means feeding the second of said coils with an alternating current to condition said core for movement in response to change in said unidirectional current; and means feeding the second energizing coil with a unidirectional current producing a magnetomotive force opposite to the magnetomotive force produced by said first energizing coil so that the resultant force on said core will be the differential of the forces induced by said energizing coils.

15. An electromagnetic valve for providing a pressurized fluid signal varying in accordance with variations in the electrical signal used to energize the valve comprising: means defining a fluid flow path; a valve element in said path; means feeding fluid pressure to the upstream side of said valve element; a pressure signal take off upstream of said valve element; a movable wall disposed adjacent said valve element and subjected on one side to fluid pressure existing on the inlet side of said valve element, said movable wall being connected to said valve element; a solenoid core connected to said valve to control the position thereof; a pair of energizing coils surrounding said solenoid core; means for energizing the first of said coils with an alternating current; a transformer connected to said energizing means; rectifying means connected to said transformer; a magnetic amplifier having bias windings, control windings, and output windings, said rectifying means being connected to the bias windings of said magnetic amplifier; a resistance bridge connected to said rectifying means; a sensing element forming one leg of said resistance bridge, said sensing element being responsive to changes in a condition being sensed to vary the resistance value of one leg in said bridge, said resistance bridge being connected to the control windings of said magnetic amplifier so as to vary the current to said control windings in accordance with changes in the condition sensed, the second of said coils being connected to the output windings of said magnetic amplifier so as to receive an electrical signal proportional to variations in the condition sensed and thus position said valve.

16. An electromagnetic valve for providing a pressurized fluid signal varying in accordance with variations in the electrical signal used to energize the valve comprising: means defining a fluid flow path; a valve element in said path; means feeding fluid pressure to the upstream side of said valve element; a pressure signal take off upstream of said valve element; a movable wall disposed adjacent said valve element and subjected on one side to fluid pressure existing on the inlet side of said valve element, said movable wall being connected to said valve element; a solenoid core connected to said valve to control the position thereof; a pair of energizing coils surrounding said solenoid core; means for transmitting an alternating current to the first of said coils; rectifying means connected to said energizing means; a magnetic amplifier connected to said rectifying means; means for transmitting to said magnetic amplifier an electrical signal whose polarity and amplitude are determined by the value of a condition sensed; and means for transmitting an electrical signal from said magnetic amplifier to the second of said coils so as to position said solenoid core in accordance with variations in the condition sensed.

References Cited in the file of this patent

UNITED STATES PATENTS

| | | |
|---|---|---|
| 2,278,396 | Saur | Mar. 31, 1942 |
| 2,407,184 | Sparrow | Sept. 3, 1946 |
| 2,451,451 | Tate | Oct. 12, 1948 |
| 2,655,132 | Scheib | Oct. 13, 1953 |
| 2,681,116 | Treseder | June 15, 1954 |
| 2,989,666 | Brenner et al. | June 20, 1961 |

FOREIGN PATENTS

| | | |
|---|---|---|
| 782,376 | Great Britain | Sept. 4, 1957 |

UNITED STATES PATENT OFFICE
CERTIFICATE OF CORRECTION

Patent No. 3,094,132

June 18, 1963

Robert C. Byloff

It is hereby certified that error appears in the above numbered patent requiring correction and that the said Letters Patent should read as corrected below.

Column 3, line 24, for "postioned" read -- positioned" column 4, lines 52 and 53, strike out "the bridge rectifier is also connected to one corner of"; column 5, line 28, after "reverse" strike out "sense"; column 9, line 14, for "theretof" read -- thereof --.

Signed and sealed this 31st day of December 1963.

(SEAL)
Attest:
ERNEST W. SWIDER

Attesting Officer

EDWIN L. REYNOLDS

Acting Commissioner of Patents